(12) United States Patent
Hu et al.

(10) Patent No.: US 11,755,177 B2
(45) Date of Patent: Sep. 12, 2023

(54) METHOD AND APPARATUS FOR ADJUSTING WINDOW, ELECTRONIC DEVICE, AND COMPUTER READABLE STORAGE MEDIUM

(71) Applicant: BEIJING XIAOMI MOBILE SOFTWARE CO., LTD, Beijing (CN)

(72) Inventors: Jubao Hu, Beijing (CN); Jianjiang Qu, Beijing (CN); Jian Miao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/730,185

(22) Filed: Apr. 27, 2022

(65) Prior Publication Data

US 2023/0146334 A1 May 11, 2023

(30) Foreign Application Priority Data

Nov. 5, 2021 (CN) .......................... 202111307985.9

(51) Int. Cl.
*G06F 3/0482* (2013.01)
*G06F 3/04847* (2022.01)
*G06F 3/04812* (2022.01)

(52) U.S. Cl.
CPC ........ *G06F 3/0482* (2013.01); *G06F 3/04812* (2013.01); *G06F 3/04847* (2013.01)

(58) Field of Classification Search
CPC ............... G06F 3/0482; G06F 3/04812; G06F 3/04847
See application file for complete search history.

(56) References Cited

U.S. PATENT DOCUMENTS

| | | | |
|---|---|---|---|
| 9,104,885 B1 * | 8/2015 | Strand | G06F 21/33 |
| 10,846,106 B1 * | 11/2020 | Curic | G06V 10/763 |
| 2010/0107118 A1 | 4/2010 | Pearce | |
| 2011/0145759 A1 * | 6/2011 | Leffert | G06F 3/04847 715/800 |
| 2012/0274852 A1 * | 11/2012 | Jung | H04N 21/4788 348/E5.097 |
| 2013/0195378 A1 * | 8/2013 | Maloney | G06F 16/4393 382/298 |
| 2017/0062012 A1 * | 3/2017 | Bloch | G11B 27/34 |
| 2017/0337661 A1 * | 11/2017 | Brady | G06F 3/0487 |

(Continued)

OTHER PUBLICATIONS

Extended European Search Report issued in Application No. 22170411.7, dated Oct. 27, 2022,(7p).

*Primary Examiner* — Beau D Spratt
*Assistant Examiner* — Reji Kartholy
(74) *Attorney, Agent, or Firm* — Arch & Lake LLP

(57) ABSTRACT

A method for adjusting a window includes: in response to detecting a first operation for triggering a specified position of the window, obtaining at least one candidate proportion of the current window based on a type of the window, and obtaining an actual proportion of the window that varies with the first operation; in response to detecting a second operation for stopping triggering the window, obtaining a difference between the at least one candidate proportion and the actual proportion, and determining a candidate proportion with the smallest difference as a target proportion; and adjusting a proportion of the window from the actual proportion to the target proportion.

15 Claims, 10 Drawing Sheets

(56) References Cited

U.S. PATENT DOCUMENTS

2019/0079662 A1\* 3/2019 Wan ...................... G06F 3/0481
2020/0186926 A1\* 6/2020 Park ...................... H04M 1/725
2021/0096732 A1\* 4/2021 Sonnino ............. G06F 3/04845
2021/0132779 A1   5/2021 Jeong et al.
2021/0400356 A1\* 12/2021 Wang ................ H04N 21/4882

\* cited by examiner

METHOD AND APPARATUS FOR ADJUSTING WINDOW, ELECTRONIC DEVICE, AND COMPUTER READABLE STORAGE MEDIUM

CROSS REFERENCE TO RELATED APPLICATIONS

This application is based upon and claims priority to Chinese Patent Application No. 202111307985.9, filed on Nov. 5, 2021, the entire content of which is incorporated herein by reference for all purposes.

TECHNICAL FIELD

The disclosure relates to a field of control technologies, and particularly to a method and an apparatus for adjusting a window, an electronic device and a computer readable storage medium.

BACKGROUND

With the popularity of electronic devices, different functions of the electronic devices are used, such as watching videos, reading novels or browsing microblogs. In some scenarios, there is a need to operate multiple windows, such as a scenario where the news is browsed without affecting the usage of the desktop.

SUMMARY

According to a first aspect of the disclosure, a method for adjusting a window is performed by an electronic device. The method includes: in response to detecting a first operation for triggering a specified position of a window, obtaining at least one candidate proportion of the window based on a type of the window, and obtaining an actual proportion of the window, in which the actual proportion of the window obtained varies with the first operation; in response to detecting a second operation for stopping triggering the window, obtaining a difference between the at least one candidate proportion and the actual proportion, and determining a candidate proportion with the smallest difference as a target proportion; and adjusting a proportion of the window from the actual proportion to the target proportion.

According to a second aspect of the disclosure, an apparatus for adjusting a window is integrated in an electronic device. The electronic device includes: a processor and a memory configured to store computer programs executable by the processor. The processor is configured to perform the above method as described in the first aspect.

According to a third aspect of the disclosure, a non-transitory computer readable storage medium is provided. When executable computer programs in the storage medium are executed by a processor, the above method as described in the first aspect is carried out.

It should be understood that, the above general descriptions and detailed descriptions are illustrative and descriptive, and may not be a limitation of the disclosure.

BRIEF DESCRIPTION OF THE DRAWINGS

The drawings herein are incorporated into the specification and constitute a part of the specification, show examples in conformity with the present disclosure, and explain the principle of the present disclosure together with the specification.

DETAILED DESCRIPTION

Figure 1A:
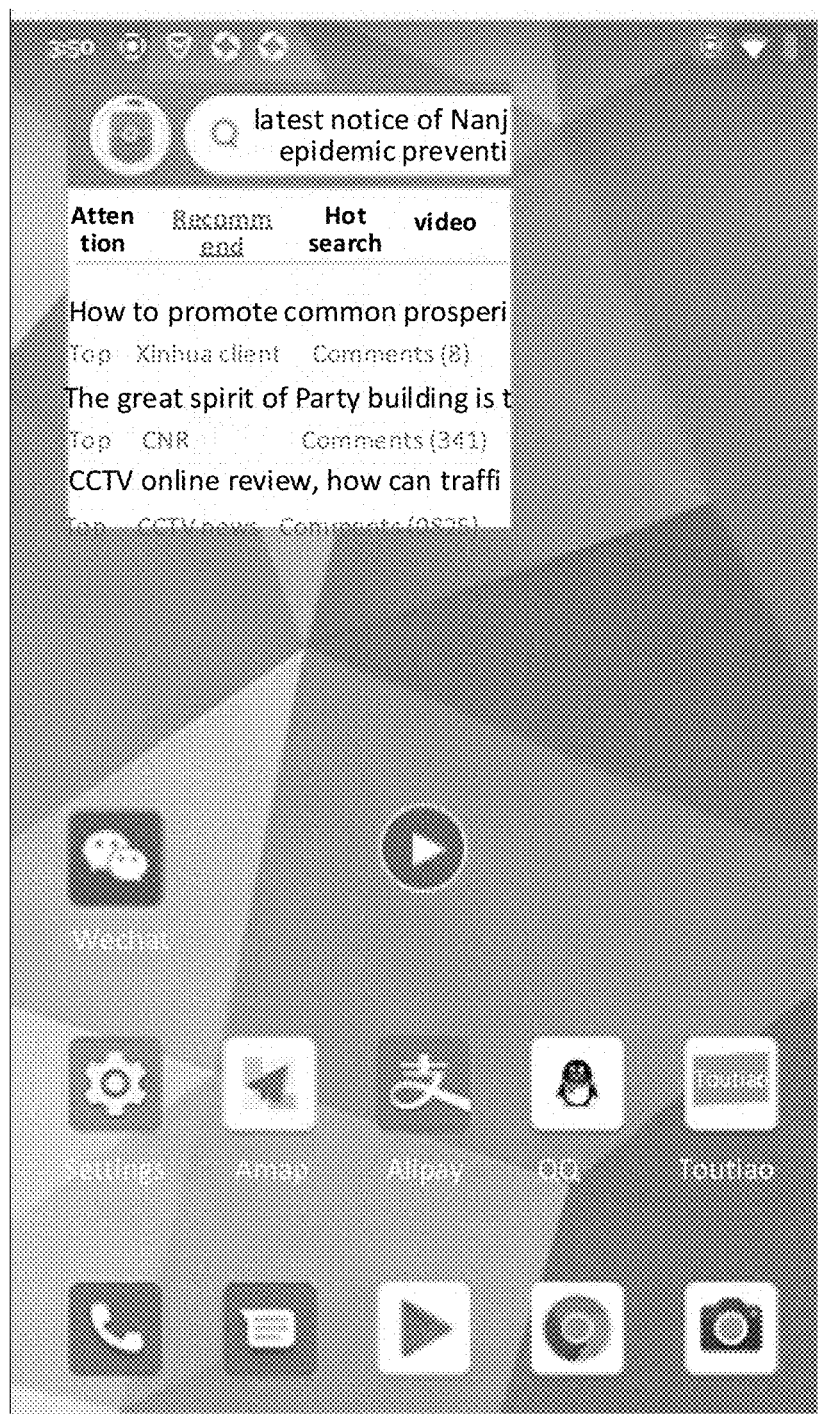
FIG. 1(a) is an effect schematic diagram illustrating mismatch before the adjustment.

The embodiments will be described in detail here, examples of which are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are merely examples of the apparatus and method consistent with some aspects of the present disclosure as detailed in the following claims. It should be noted that the features in the following embodiments and embodiments can be combined with each other without conflict.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

Figure 1B:
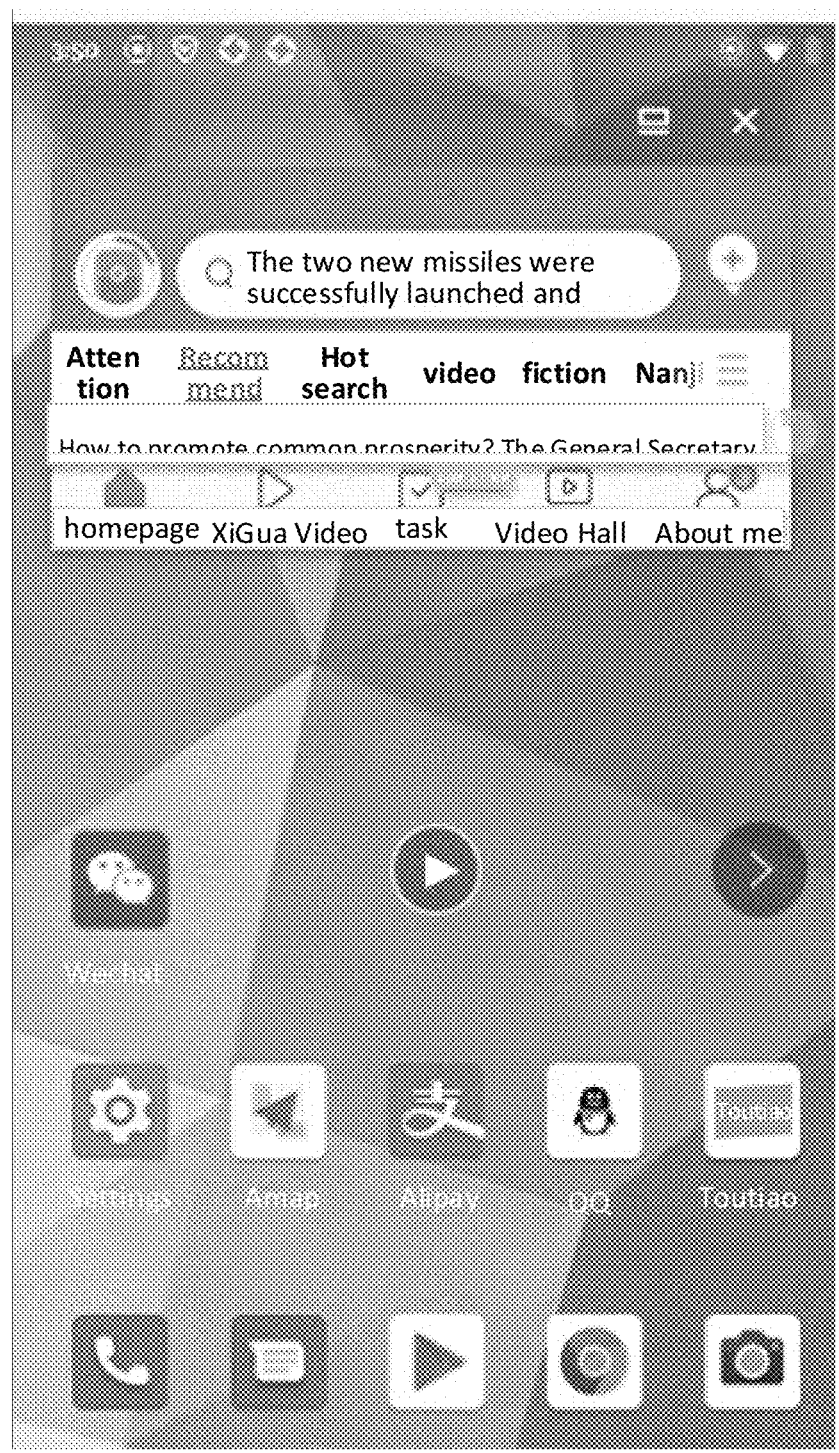
FIG. 1(b) is an effect schematic diagram illustrating mismatch before the adjustment.

With the popularity of electronic devices, different functions of the electronic devices are used, such as watching videos, reading novels or browsing microblogs. In some scenarios, there is a need to operate multiple windows, such as a scenario where the news is browsed without affecting the usage of the desktop. Taking this scenario as an example, as shown in FIG. 1(a), when an application is opened in a small window, the proportion of the application content displayed does not match the window size without considering compatibility of the application display layout. In this scenario, as shown in FIG. 1(b), the users need to drag the window interface up, down, left and right for browsing, which reduces user experience.

During the process of implementing the present disclosure, it is found that the reason for the above incompatibility of the application display layout is that, the Android system allows users to freely adjust the window proportion, and an application may adapt to the proportion (e.g. 4:3) supported by the Android system in the development process; however, the window proportion (e.g. 4:2.5) adjusted by the users is usually not the proportion supported by the Android system, the window page corresponding to 4:2.5 may be displayed in the display process and the remaining window page (i.e., 0.5 in the width direction) may be blocked, which leads to the result that the page is not fully displayed (i.e., the application page is incompatible with the window adjusted).

Figure 2:
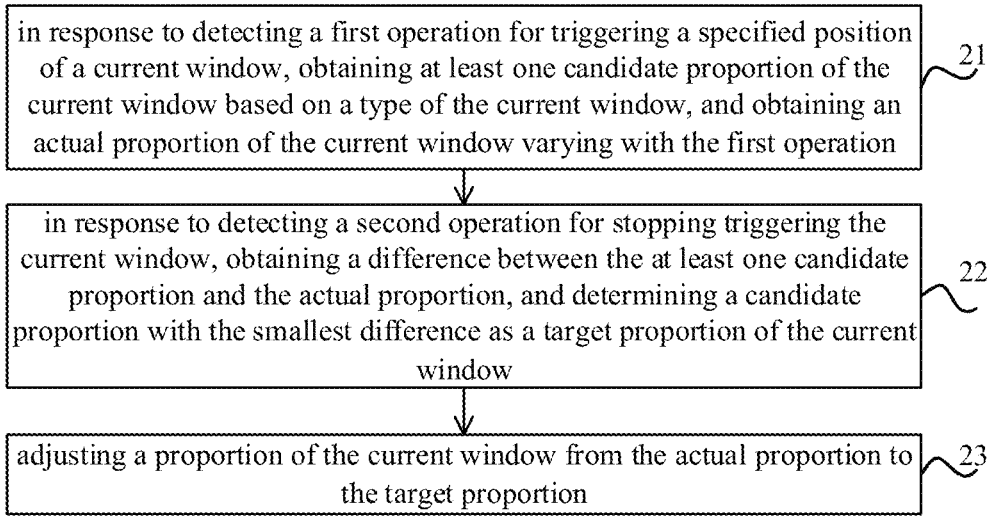
FIG. 2 is a flowchart illustrating a method for adjusting a window according to one or more examples of the present disclosure.

In order to solve the above technical problem, the example of the disclosure provides a method for adjusting a window, which can be applied to an electronic device. The electronic device can include a device with a large display screen such as a tablet computer. In subsequent examples, an electronic device with a touch display screen is used to describe the solution of each example, but does not constitute a limitation to the solution of the disclosure. FIG. 2 is a flowchart illustrating a method for adjusting a window according to an example. Referring to FIG. 2, the method for adjusting a window includes steps at 21 to 23.

At 21, in response to detecting a first operation for triggering a specified position of a current window, at least one candidate proportion of the current window is obtained based on a type of the current window, and an actual proportion of the current window varying with the first operation is obtained.

In the example, the electronic device can detect a touch operation from the user on the touch display screen, such as clicking, double clicking, sliding and other operations. Considering that the operation is usually continuous when adjusting the window proportion or size, each solution in the subsequent examples is described by taking the sliding operation as an example.

In the example, the specified position (e.g., a position indicated by the letter A shown in FIG. 3) can be at least one of the upper left corner, lower left corner, upper right corner and lower right corner of the current window. When one corner at the specified position is pressed by the user for sliding, the specified position of the current window may slide from the starting position to the stop position of sliding and two edges corresponding to the specified position also slide synchronously, so as to ensure that the proportion of the current window remains unchanged.

Figure 3:
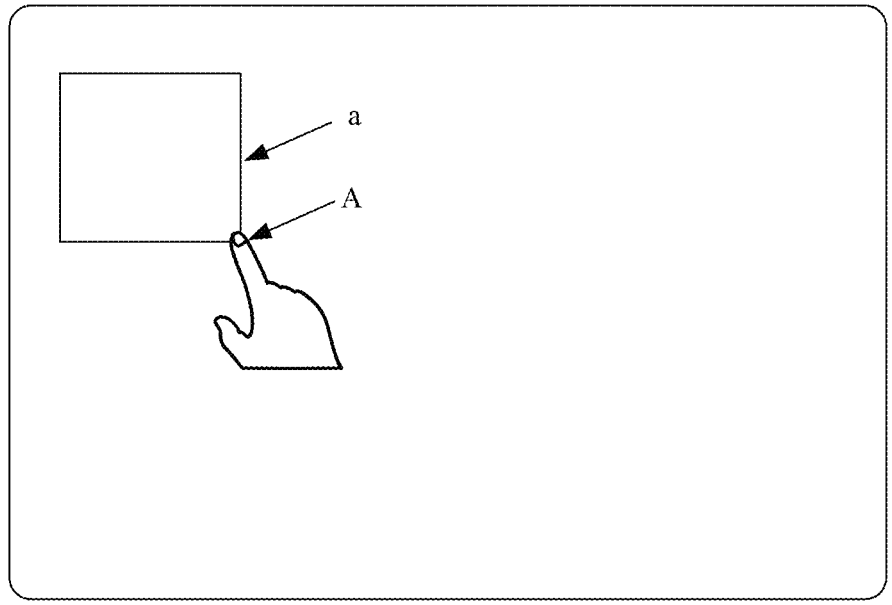
FIG. 3 is a schematic diagram illustrating a designated position being the lower right corner of a current window according to one or more examples of the present disclosure.

In the example, the touch display screen may detect the user operation. When the first operation that the user triggers the specified position of the current window is detected, the above touch data may be sent to a processor of the electronic device, so that the electronic device can detect the first operation for triggering the specified position of the current window. As shown in FIG. 3, the specified position is the lower right corner of the current window. The first operation includes an operation that the user starts to contact the touch display screen and a subsequent sliding operation, such as a shadow bar illustrated in FIG. 4.

Figure 4:
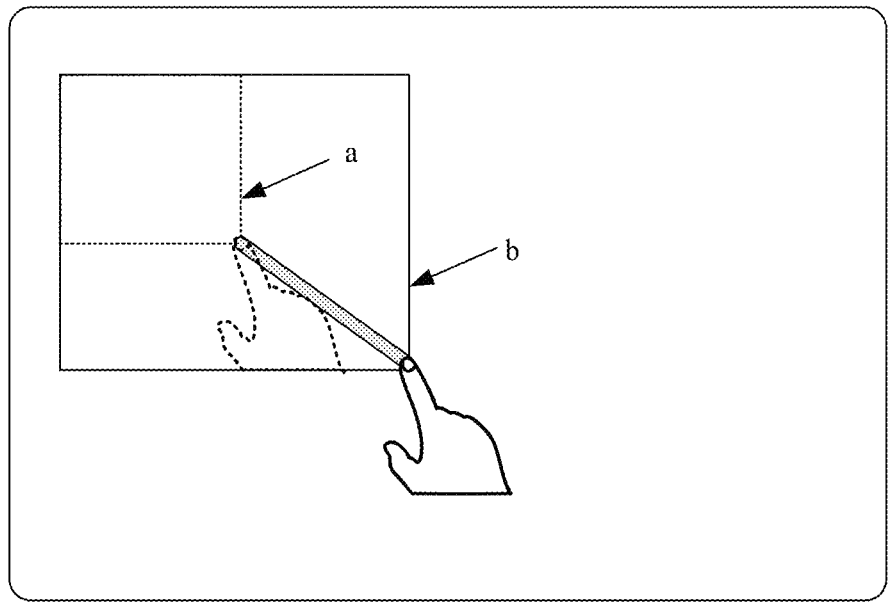
FIG. 4 is a schematic diagram illustrating the current window changes with a first operation according to one or more examples of the present disclosure.

In the example, when the electronic device detects the first operation for triggering the specified position of the current window, in response to the first operation the electronic device can obtain the actual proportion of the current window changing with the first operation. That is, the proportion of the current window may vary with the change of the specified position, and the area of the current window may be expanded or shrank. The proportion of the current window after the change is called the actual proportion. As shown in FIG. 4, the current window changes from the proportion a shown in FIG. 3 to the proportion b.

In the example, when the electronic device detects the first operation for triggering the specified position of the current window, the electronic device can obtain at least one candidate proportion of the current window based on the type of the current window in response to the first operation.

Figure 5:
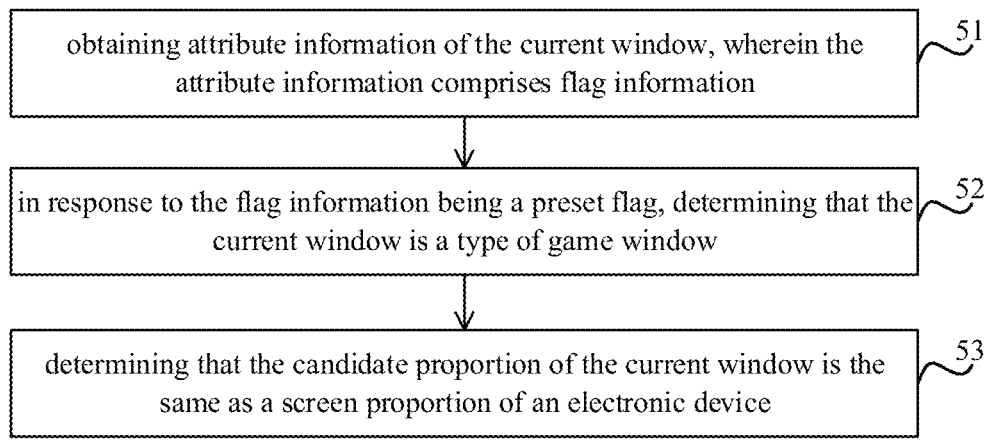
FIG. 5 is a flowchart illustrating obtaining a candidate proportion according to one or more examples of the present disclosure.

In an example, referring to FIG. 5, at 51, the electronic device can obtain attribute information of the current window, and the attribute information includes flag information. The flag information can be a Flags field in the Android system. For example, the electronic device can read the Flags field in Applicationinfo information of an application in the current window. At 52, when the flag information is a preset flag (e.g., ApplicationInfo.FLAG_IS_GAME), the electronic device can determine that the current window is a type of game window. At 53, the electronic device may determine that the candidate proportion of the current window is same as the screen proportion of the electronic device. For example, when the touch display proportion of the electronic device is 16:9, the candidate proportion of the current window is 16:9. In this way, in the example, the window with the type of game window can be set as the screen proportion, thus achieving the effect of being consistent with the proportion of the display screen.

Figure 6:
FIG. 6 is a schematic diagram illustrating a screen proportion is 16:9 according to one or more examples of the present disclosure.

In another example, after the step at 51 is performed, when the flag information is a non-preset flag (in other words, there is no the above preset flag, ApplicationInfo-.FLAG_IS_GAME), the electronic device can determine whether an application in the current window is in a preset game list; When the above application in the current window is in the preset game list, the electronic device can determine that the current window is the type of game window, and the electronic device can determine that the candidate proportion of the current window is same as the screen proportion of the electronic device. As shown in FIG. 6, both the proportion of the current window and the screen proportion are 16:9. In this way, in the example, the window with the type of game window can be set as the screen proportion, thus achieving the effect of being consistent with the proportion of the display screen.

Figure 7:
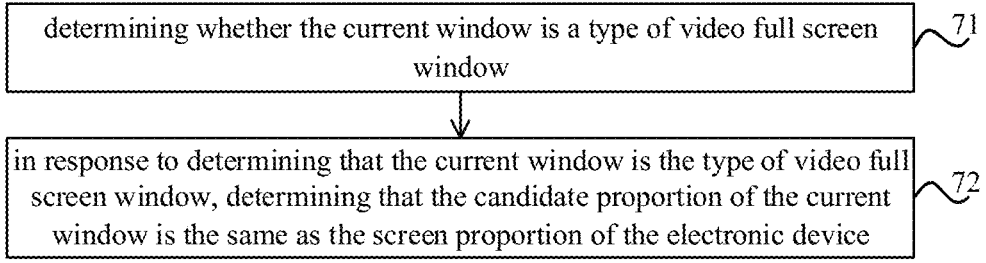
FIG. 7 is a flowchart illustrating another method for obtaining a candidate proportion according to one or more examples of the present disclosure.

In another example, referring to FIG. 7, at 71, the electronic device can determine whether the current window is a type of video full screen window. For example, the electronic device can obtain the attribute information of the current window, and the attribute information can include a package name "packagename" and a "mOrientation" attribute. The above "mOrientation" attribute is used to determine a screen mode corresponding to the current window, such as a landscape screen mode or a portrait screen mode. The electronic device can determine whether the above package name is in a preset video list. When the above package name is in the preset video list, the electronic device can determine the screen mode corresponding to the current window (based on the "mOrientation" attribute of the current window). When the current window corresponds to the landscape screen mode, the electronic device can obtain system visible parameters (systemUiVisibility) of the current window. When the above system visible parameters include a full screen parameter (FULLSCREEN) and a hidden navigation bar (HIDE_NAVIGATION), the electronic device can determine that the current window is the type of video full screen window. At 72, when the current window is the type of video full screen window, the electronic device can determine that the candidate proportion of the current window is same as the screen proportion of the electronic device. As shown in FIG. 6, both the proportion of the current window and the screen proportion are 16:9.

Figure 10:
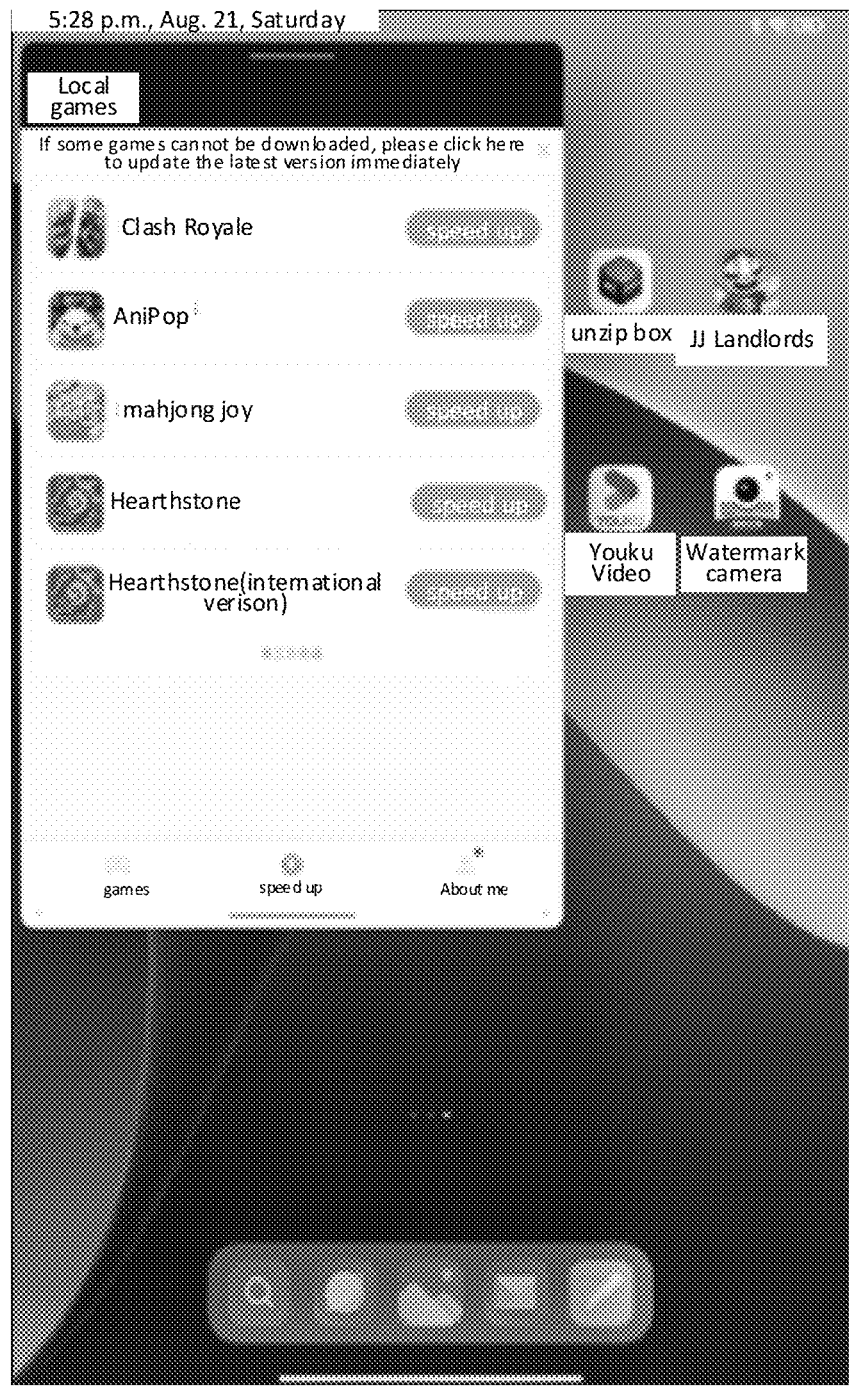
FIG. 10 is a schematic diagram illustrating a proportion of the current window is 3:4 according to one or more examples of the present disclosure.
Figure 11:
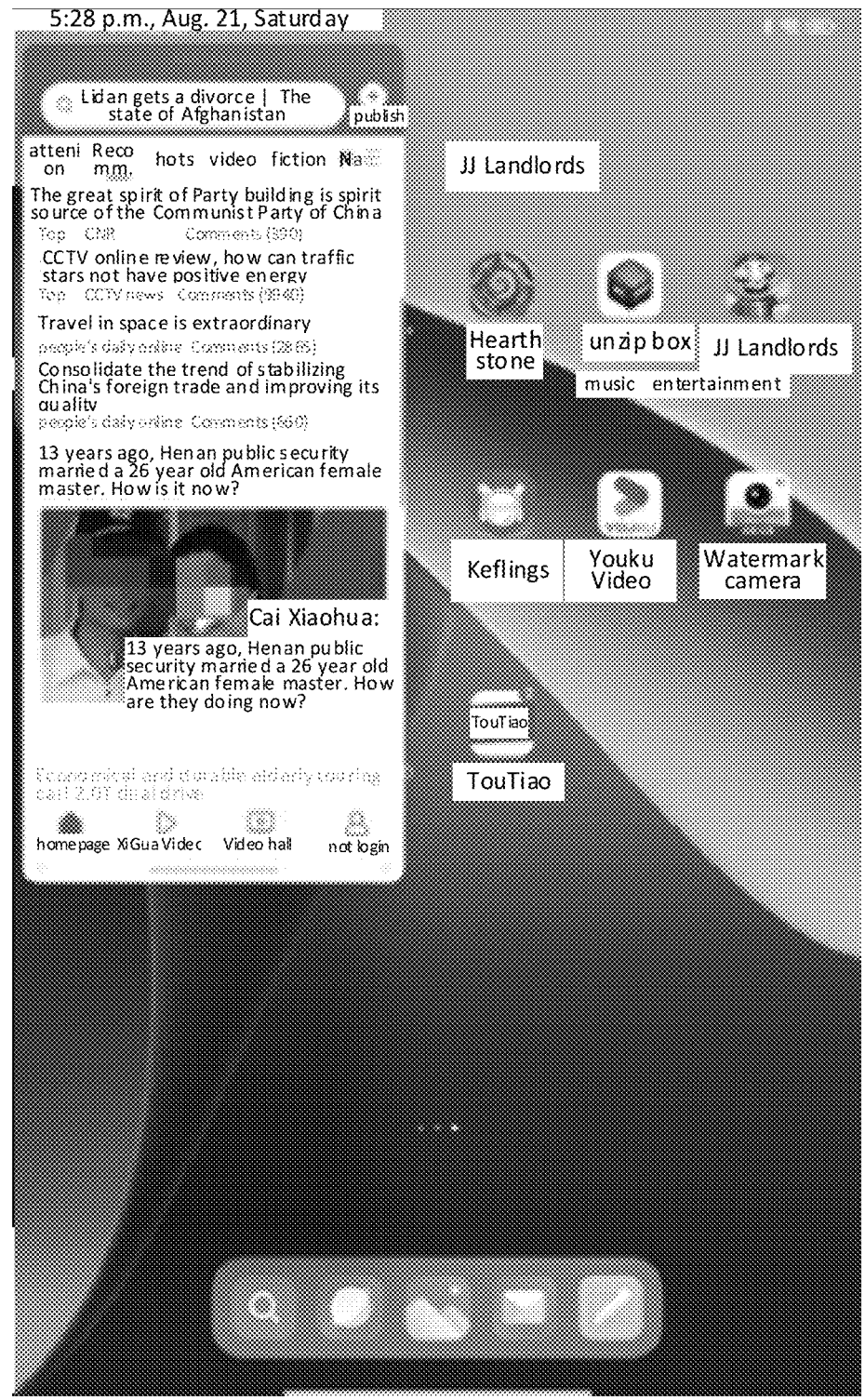
FIG. 11 is a schematic diagram illustrating a proportion of the current window is 1:2.16 according to one or more examples of the present disclosure.

In an example, when the current window is in the landscape screen mode, it indicates that the current window is displayed in a horizontal orientation. As shown in FIG. 6, the current window is in the landscape screen mode, which is consistent with the display screen direction of the electronic device. In an example, when the current window is in the portrait screen mode, it indicates that the current window is displayed in a vertical orientation. As shown in FIG. 10 and FIG. 11, the current window is in the portrait screen mode, which is consistent with the display screen direction of the electronic device.

Figure 8:
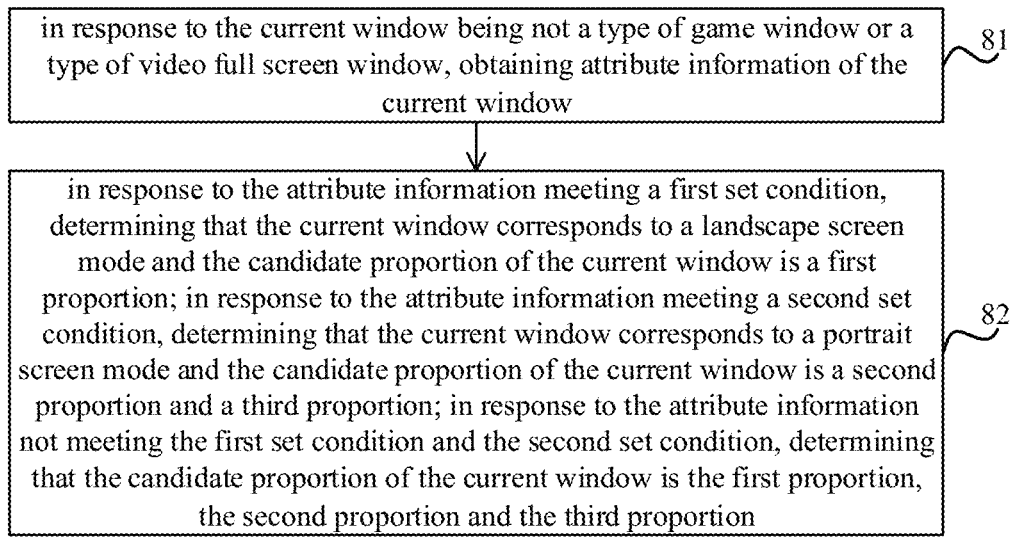
FIG. 8 is a flowchart illustrating yet another method for obtaining a candidate proportion according to one or more examples of the present disclosure.

In another example, referring to FIG. 8, At 81, when the current window is not a type of game window or a type of video full screen window, the electronic device can obtain attribute information (such as, a "mOrientation" attribute) of the current window.

Figure 9:
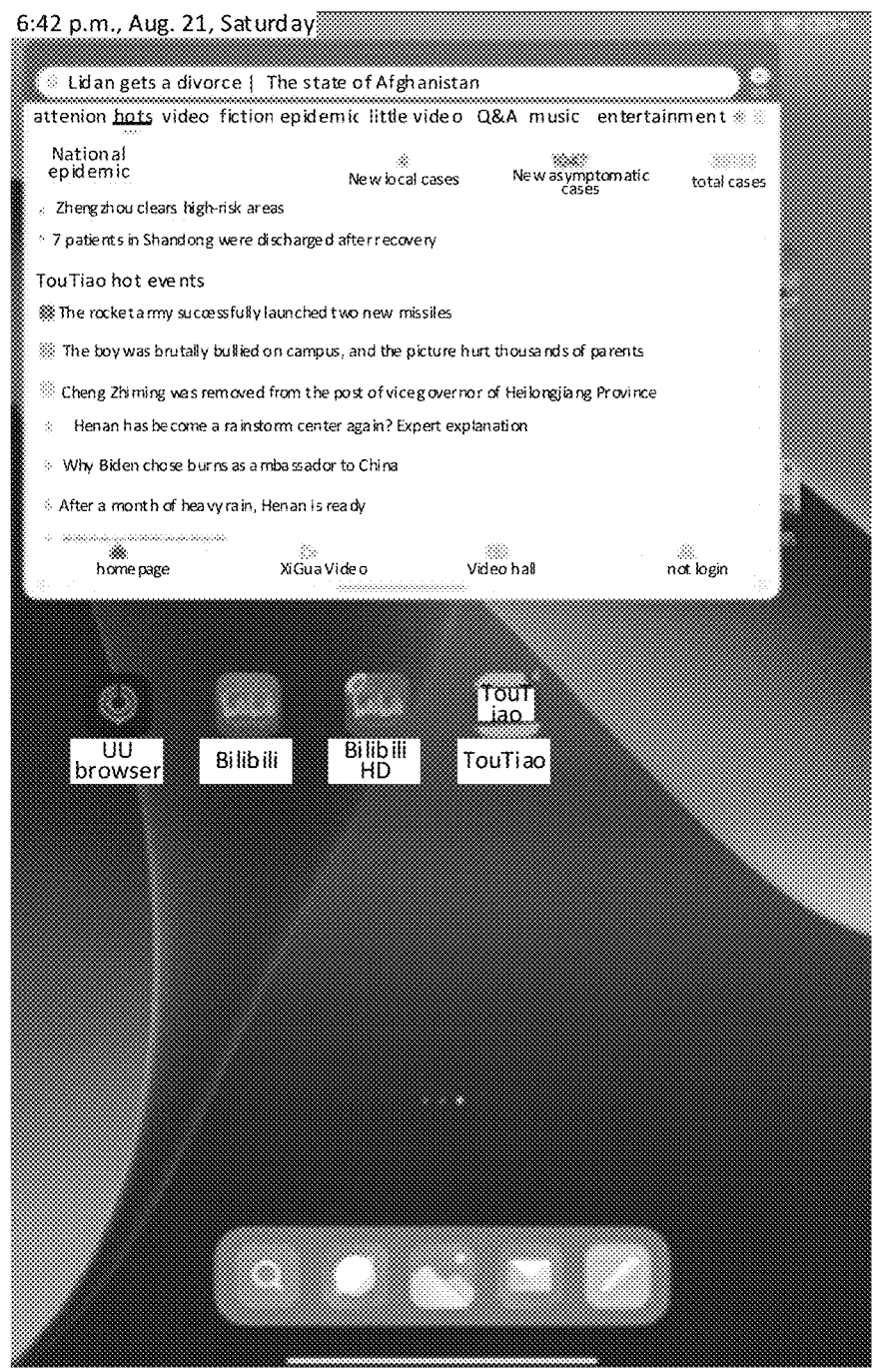
FIG. 9 is a schematic diagram illustrating a proportion of the current window is 4:3 according to one or more examples of the present disclosure.

At 82, when the attribute information meets a first set condition, the electronic device can determine that the current window corresponds to a landscape screen mode and the candidate proportion of the current window is a first proportion (such as 4:3), the effect of which is shown in FIG. 9. The first set condition may include at least one of the following:

enabling the screen in a landscape mode and unaffected by a direction sensor (mOrientation==ActivityInfo.SCREEN_ORIENTATION_LANDSCAPE);

enabling the screen in a landscape mode and changing a screen direction based on a direction sensor (mOrientation==ActivityInfo.SCREEN_ORIENTATION_SENSOR_LANDSCAPE)

enabling the screen in a landscape mode and in a direction reverse to the portrait (mOrientation==ActivityInfo.SCREEN_ORIENTATION_REVERSE_LANDSCAPE); and enabling the screen in a landscape mode and rotating a direction based on a sensor (mOrientation==ActivityInfo.SCREEN_ORIENTATION_USER_LANDSCAPE).

When the above attribute information meets the second set condition, the electronic device can determine the current window corresponds to a portrait screen mode and the candidate proportions of the current window are a second proportion (e.g., 3:4, its effect is shown in FIG. 10) and a third proportion (e.g., 1:2.16, its effect is shown in FIG. 11). The second set condition may include at least one of the following:

enabling the screen in a portrait mode and unaffected by a direction sensor (mOrientation==ActivityInfo.SCREEN_ORIENTATION_PORTRAIT);

enabling the screen in a portrait mode and changing a screen direction based on a direction sensor (mOrientation==ActivityInfo.SCREEN_ORIENTATION_SENSOR_PORTRAIT)

enabling the screen in a portrait mode and in a direction reverse to the portrait (mOrientation==ActivityInfo.SCREEN_ORIENTATION_REVERSE_PORTRAIT); and enabling the screen in a portrait mode and rotating a direction based on a sensor (mOrientation==ActivityInfo.SCREEN_ORIENTATION_USER_PORTRAIT).

The above direction reverse to the portrait refers to a direction obtained by rotating 180 degrees relative to the direction in the landscape mode, so that the page content displayed to the user is opposite to that in the landscape mode.

When the attribute information does not meet the above first set condition or the second set condition, the electronic device can determine that the candidate proportions of the current window are the first proportion (the effect is shown in FIG. 9), the second proportion (the effect is shown in FIG. 10) and the third proportion (the effect is shown in FIG. 11).

It should be noted that the above first proportion, second proportion and third proportion refer to a window proportion obtained by the application in the current window adapting to the Android system, that is, a window proportion preset in a native scheme in the Android system.

In this way, through the example solutions shown in FIG. 5 to FIG. 8, the electronic device can obtain at least one candidate proportion corresponding to the current window through the above examples.

At 22, in response to detecting a second operation for stopping triggering the current window, a difference between the at least one candidate proportion and the actual proportion is obtained, and a candidate proportion with the smallest difference is determined as a target proportion of the current window.

In the example, the electronic device can continue to detect a touch operation of the user on the touch display screen. Considering an operation (later called a second operation) that the user lifts from the specified position of the current window when the sliding operation ends. When it is detected the sliding operation ends, the electronic device can determine that the second operation for stopping triggering the current window is detected. At this time, the electronic device can obtain the difference between each of the at least one candidate proportion and the actual proportion. For the convenience of calculation, in the example, the candidate proportion and the actual proportion can be pre-processed into a mode of 1:X. For example, the proportion of 4:3 is preprocessed into 1:0.75 and the proportion of 3:4 is preprocessed into 1:1.33, etc. Then, the electronic device needs to calculate the difference between the candidate proportion (x1) and the actual proportion (x2). At this time, the electronic device can determine a candidate proportion with the smallest difference as the target proportion of the current window. In other words, when the proportion of the current window is adjusted, in response to the user releasing his hand, the electronic device can select a candidate proportion closest to the actual proportion corresponding to the release as the target proportion and adsorb to the target proportion.

At 23, a proportion of the current window is adjusted from the actual proportion to the target proportion.

In the example, the electronic device can adjust the proportion of the current window from the actual proportion to the target proportion. For example, the processor of the electronic device can notify the Android system that the size of the current window has changed and the application in the current window can be refreshed and the layout can be loaded, and can also notify a window management system (WMS) service in a relayout method. The WMS traverses all windows in the touch display screen, calculates a final size of all the windows, and finally applies them to Surface-Flinger for rendering display, so as to finally adjust the proportion of the current window.

So far, in this example, the proportion of the current window is adjusted to the target proportion based on the type of the current window. When the target proportion is the proportion supported by the Android system, the application may adapt the proportion of the page based on the proportion supported by the Android system, so as to achieve the effect that the proportion of the current window is matched with the displayed page, avoid the problem of mismatch between the current window and the displayed page, and improve the use experience.

Figure 12:
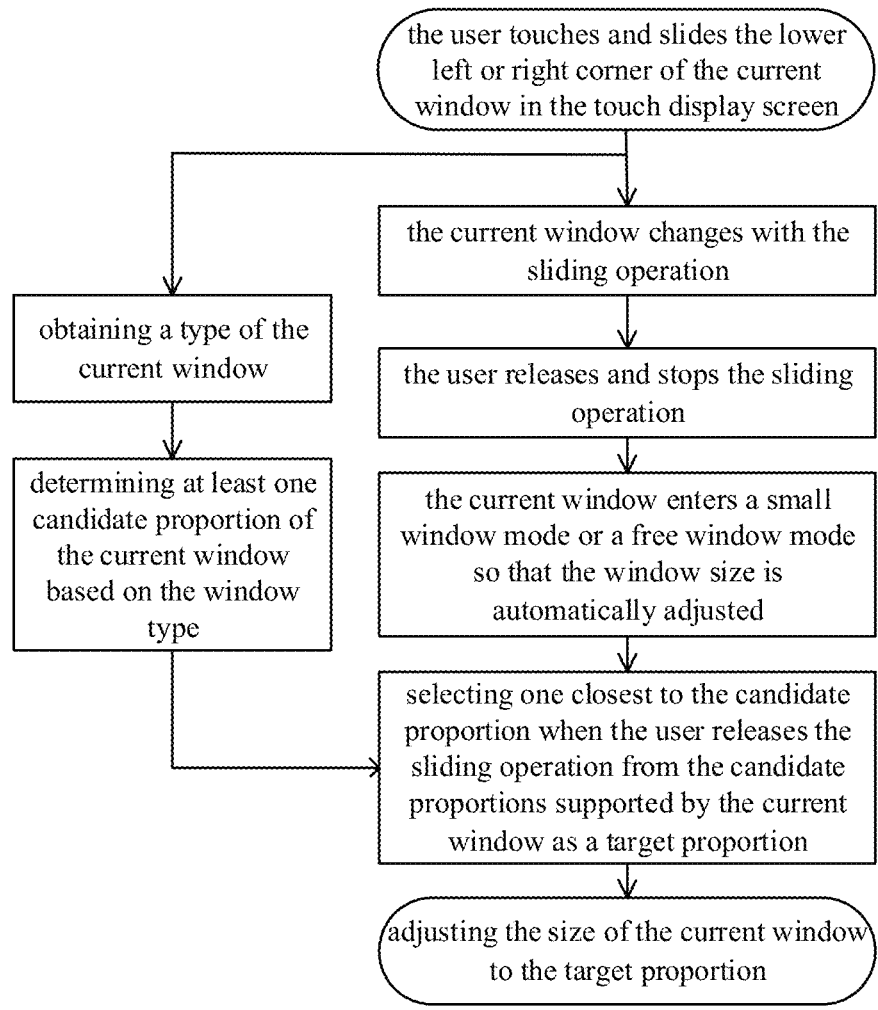
FIG. 12 is a flowchart illustrating a method for adjusting a window according to one or more examples of the present disclosure.

The above solution is described below in combination with a scenario where the user slides and adjusts the current window in the electronic device, as shown in FIG. 12.

The user touches and slides the lower left or right corner of the current window in the touch display screen. At this time, the electronic device can obtain a type of the current window, such as a type of game window, a type of video full screen window, a type of non-game window or a type of non-video full screen window in a landscape screen mode, a type of non-game window or a type of non-video full screen window in a portrait screen mode, and a type of non-game window or a type of non-video full screen window in other modes. Then, the electronic device may select at least one candidate window based on the type of the current window. For example, when the current window is the type of game window, the candidate proportion of the current window is same as the screen proportion. When the current window is the type of video full screen window, the candidate proportion of the current window is same as the screen proportion. When the current window is the type of non-game window or the type of non-video full screen window in the landscape screen mode, the candidate proportion of the current window is 4:3, the effect of which is shown in FIG. 9. When the current window is the type of non-game window or the type of non-video full screen window in the portrait screen mode, the candidate proportion of the current window is 3:4 and 1:2.16, the effects of which are respectively shown in FIG. 10 and FIG. 11. When the current window is the type of non-game window or the type of non-video full screen window in other modes, the candidate ratio is 4:3, 3:4 and 1:2.16.

When the user touches and slides the lower left or right corner of the current window in the touch display screen, the current window may change following the sliding operation (e.g., the scale and size of the current window may change). After the user releases and stops the sliding operation, the current window may enter a small window mode or a free window mode. The electronic device can then resize the current window. One of the above at least one candidate proportion is selected as a target proportion, which is closest to the candidate proportion when the user releases the sliding operation. Then, the size of the current window is adjusted to the target proportion.

Figure 13:
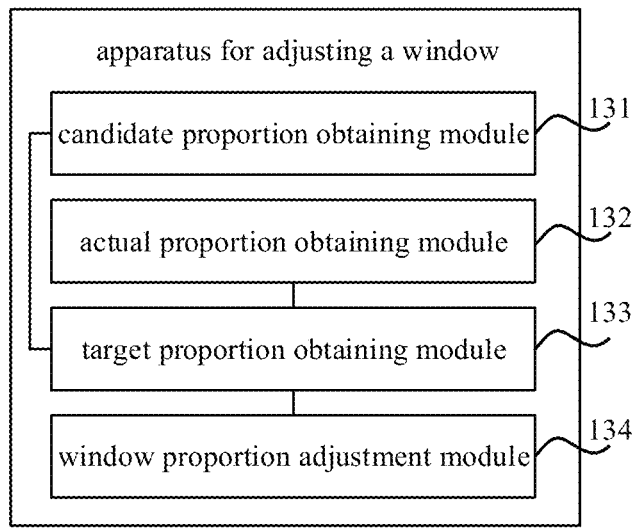
FIG. 13 is a block diagram illustrating an apparatus for adjusting a window according to one or more examples of the present disclosure.

On the basis of the above method for adjusting a window, the example of the disclosure also provides an apparatus for adjusting a window, which is applied to an electronic device. Referring to FIG. 13. The apparatus includes a candidate proportion obtaining module 131, an actual proportion obtaining module 132, a target proportion obtaining module 133 and a window proportion adjustment module 134.

The candidate proportion obtaining module is configured to in response to detecting a first operation for triggering a specified position of a current window, obtain at least one candidate proportion of the current window based on a type of the current window.

The actual proportion obtaining module is configured to in response to detecting the first operation for triggering the specified position of the current window, obtain an actual proportion of the current window, in which the actual proportion of the current window obtained varies with the first operation.

The target proportion obtaining module is configured to in response to detecting a second operation for stopping triggering the current window, obtain a difference between the at least one candidate proportion and the actual proportion, and determine a candidate proportion with the smallest difference as a target proportion of the current window.

The window proportion adjustment module is configured to adjust a proportion of the current window from the actual proportion to the target proportion.

In an example, the candidate proportion obtaining module includes an attribute information obtaining sub module, an attribute information obtaining sub module, a game type determination sub module and a candidate proportion obtaining sub module.

The attribute information obtaining sub module is configured to obtain attribute information of the current window, in which the attribute information includes flag information.

The game type determination sub module is configured to determine that the current window is a type of game window in response to the flag information being a preset flag.

The candidate proportion obtaining sub module is configured to determine that the candidate proportion of the current window is same as a screen proportion of an electronic device.

In an example, the candidate proportion obtaining module further includes: an application determination unit, a game type determination unit and a candidate proportion obtaining sub module.

The application determination unit, configured to determine whether an application in the current window is within a preset game list in response to the flag information being not included in the attribute information;

The game type determination unit is configured to determine that the current window is the type of game window in response to determining that the application in the current window is within the preset game list.

The candidate proportion obtaining sub module is configured to determine that the candidate proportion of the current window is same as the screen proportion of the electronic device.

In an example, the candidate proportion obtaining module includes: a video page determination sub module, and a candidate proportion obtaining sub module.

The video page determination sub module is configured to determine whether the current window is a type of video full screen window.

The candidate proportion obtaining sub module is configured to determine that the candidate proportion of the current window is same as the screen proportion of the electronic device in response to determining that the current window is the type of video full screen window.

In an example, the video page determination sub module includes: an attribute information obtaining unit, a package name determination unit, a screen mode determination unit, a visible parameter obtaining unit and a video page determination unit.

The attribute information obtaining unit is configured to obtain attribute information of the current window.

The package name determination unit is configured to determine whether a package name in the attribute information is within a preset video list.

The screen mode determination unit is configured to determine a screen mode corresponding to the current window in response to determining that the package name in the attribute information is within a preset video list.

The visible parameter obtaining unit is configured to obtain system visible parameters of the current window in response to the current window corresponding to a landscape screen mode.

The video page determination unit is configured to determine that the current window is the type of video full screen window in response to the system visible parameters including a full screen parameter and a hidden navigation bar.

In an example, the candidate proportion obtaining module includes: an attribute information obtaining sub module, and a candidate proportion determination sub module.

The attribute information obtaining sub module is configured to obtain attribute information of the current window in response to the current window being not a type of game window or a type of video full screen window;

The candidate proportion determination sub module is configured to determine that the current window corresponds to a landscape screen mode and the candidate proportion of the current window is a first proportion in response to the attribute information meeting a first set condition; determine the current window corresponds to a portrait screen mode and the candidate proportions of the current window are a second proportion and a third proportion, in response to the attribute information meeting a second set condition; determine that the candidate proportions of the current window are the first proportion, the second proportion and the third proportion in response to the attribute information not meeting the first set condition or the second set condition.

It should be noted that the content of the method examples is matched to the apparatus and device shown in the examples, which may refer to the content of the above method example and may not be repeated here.

Figure 14:
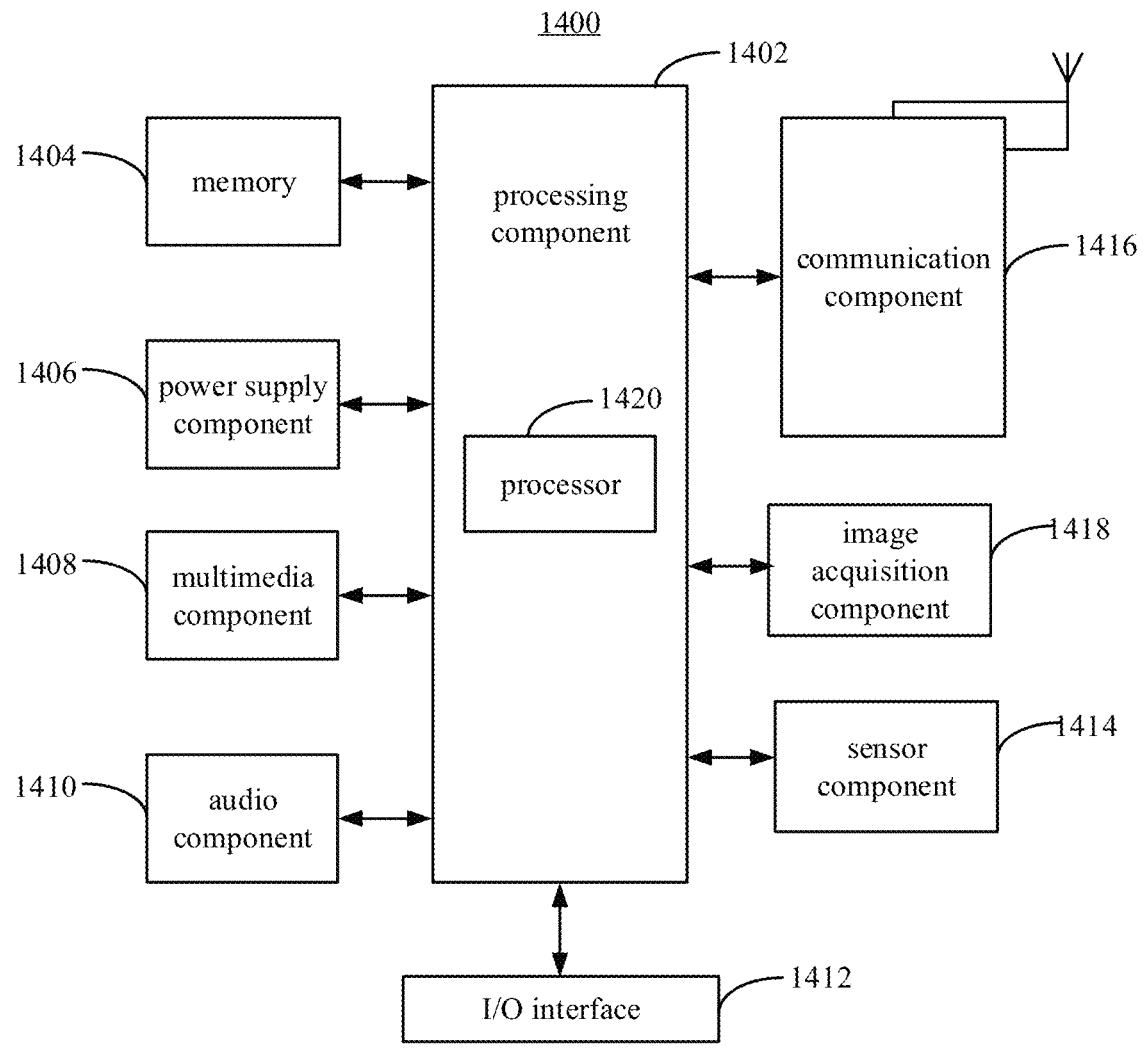
FIG. 14 is a block diagram illustrating an electronic device according to one or more examples of the present disclosure.

FIG. 14 is a block diagram illustrating an electronic device according to an example. For example, the device 1400 may be a mobile phone, a computer, a digital broadcasting terminal, a messaging device, a game console, a tablet device, a medical equipment, a fitness equipment, a personal digital assistant, etc.

As illustrated in FIG. 14, the device 1400 may include one or more components: a processing component 1402, a memory 1404, a power supply component 1406, a multimedia component 1408, an audio component 1410, an input/output (I/O) interface 1412, a sensor component 1414, a communication component 1416 and an image acquisition component 1418.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For example, the processing component 1402 may include a multimedia module for the convenience of interaction between the multimedia component 1408 and the processing component 1402.

The memory 1404 is configured to store all types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1406 may provide power for all components of the device 1400. The power supply component 1406 may include power supply management system, one or more power supplies, and other units related to generating, managing and distributing power for the device 1400. The power supply component 1406 may include a power chip, and the controller may communicate with the power chip, so as to control the power chip to turn on or off a switching device so that the battery can supply power to or not supply power to the main board circuit.

The multimedia component 1408 includes a screen providing an output interface between the device 1400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 1410 is configured to output and/or input audio file information. For example, the audio component 1410 includes a microphone (MIC) configured to receive external audio file information when the device 1400 is in an operation mode, such as a call mode, a recording mode, and a voice recognition mode. The received audio file information may be further stored in the memory 1404 or transmitted via the communication component 1416. In some examples, the audio component 1410 further includes a speaker to output audio file information.

The I/O interface 1412 provides an interface for the processing component 1402 and the peripheral interface module, and the peripheral interface module may be a keyboard, a click wheel, a button, etc.

The sensor component 1414 includes one or more sensors to provide status assessments of various aspects of the device 1400. For example, the sensor component 1414 may detect the on/off state of the device 1400 and the relative positioning of the component. For example, the component is a display and a keypad of the device 1400. The sensor component 1414 may further detect the position change of the device 1400 or a component of the device 1400, a presence or absence of contact between a target object and the device 1400, an orientation or acceleration/deceleration of the device 1400, and the temperature change of the device 1400. In the example, the sensor component 1414 may include a magnetic sensor, a gyroscope and a magnetic field sensor. The magnetic field sensor includes at least one of the following: a Hall sensor, a thin film magneto-resistance sensor and a magnetic fluid acceleration sensor.

The communication component 1416 is configured to facilitate communication, wired or wirelessly, between the device 1400 and other devices. The device 1400 may access wireless networks based on a communication standard, such as WiFi, 2G or 3G, 4G LTE, 5G NR or their combination. In an example, the communication component 1416 receives broadcast information or broadcast associated information from an external broadcast management system via a broadcast channel. In an example, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example, the device 1400 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics elements.

In an example, an electronic device is also provided, which includes
 a processor; and
 a memory configured to store computer programs executable by the processor.

The processor is configured to execute the computer programs in the memory, the method of the example as shown in FIG. 2 is carried out.

In an example, a computer readable storage medium is also provided, for example, a memory including executable computer programs. When the executable computer programs may be performed by a processor, the method of the example as shown in FIG. 2 is carried out. The computer-readable storage medium may be a ROM, a RAM, a CD-ROM, a magnetic tape, a floppy disc, an optical data storage device, and the like.

With the above examples of the disclosure, when the target proportion is one supported by the Android system, the application may adapt to the page proportion based on the one supported by the Android system, thus achieving an effect that the proportion of the current window is matched with that of the displayed page, and avoiding the problem of mismatch between the window and the page, which is helpful to improve the user experience.

After considering the specification and practicing the disclosure herein, those skilled in the art will be aware of other examples of the present application. The specification and examples are described as examples, and the true scope of the disclosure are indicated by the following claims. It should be understood that the present disclosure is not limited to the precise structure described above and shown in the drawings.

What is claimed is:

1. A method for adjusting a window, comprising:
 in response to detecting a first operation for triggering a specified position of the window, obtaining, by an electronic device, at least one candidate proportion of the window based on a type of the window, and obtaining an actual proportion of the window, wherein the actual proportion of the window obtained varies with the first operation;
 in response to detecting a second operation for stopping triggering the window, obtaining, by the electronic device, a difference between the at least one candidate proportion and the actual proportion, and determining a candidate proportion with a smallest difference as a target proportion; and
 adjusting, by the electronic device, a proportion of the window from the actual proportion to the target proportion;
 wherein obtaining at least one candidate proportion of the window comprises:
 in response to the window being not a type of game window or a type of video full screen window, obtaining attribute information of the window;
  in response to the attribute information of the window meeting a first set condition, determining that the window corresponds to a landscape screen mode and the candidate proportion of the window is a first proportion;
  in response to the attribute information of the window meeting a second set condition, determining that the window corresponds to a portrait screen mode and the candidate proportion& of the window are a second proportion and a third proportion;
  in response to the attribute information of the window not meeting the first set condition or the second set condition, determining that the candidate proportions of the window are the first proportion, the second proportion and the third proportion;
  wherein the first proportion, the second proportion and the third proportion are preset in a native scheme in an Android system of the electronic device to enable an application in the window to adapt to the Android system.

2. The method of claim 1, wherein obtaining at least one candidate proportion of the window comprises:
  obtaining attribute information of the window, wherein the attribute information comprises flag information;
  in response to the flag information being a preset flag, determining that the window is a type of game window; and
  determining that the candidate proportion of the window is same as a screen proportion of the electronic device.

3. The method of claim 2, wherein the method further comprises:
  in response to the flag information being not included in the attribute information, determining whether an application in the window is within a preset game list;
  in response to determining that the application in the window is within the preset game list, determining that the window is the type of game window; and
  determining that the candidate proportion of the window is same as the screen proportion of the electronic device.

4. The method of claim 1, wherein obtaining at least one candidate proportion of the window comprises:
  in response to determining that the window is a type of video full screen window, determining that the candidate proportion of the window is same as the screen proportion of the electronic device.

5. The method of claim 4, wherein determining the window is the type of video full screen window comprises:
  obtaining attribute information of the window;
  in response to determining that a package name in the attribute information is within a preset video list, determining a screen mode corresponding to the window;
  in response to the window corresponding to a landscape screen mode, obtaining system visible parameters of the window; and
  in response to the system visible parameters including a full screen parameter and a hidden navigation bar, determining that the window is the type of video full screen window.

6. An apparatus for adjusting a window, integrated in an electronic device, comprising:
  a processor; and
  a memory configured to store computer programs executable by the processor;
  wherein the processor is configured to:
  obtain at least one candidate proportion of the window based on a type of the window and obtain an actual proportion of the window that varies with a first operation, in response to detecting the first operation for triggering a specified position of the window;
  in response to detecting a second operation for stopping triggering the window, obtain a difference between the at least one candidate proportion and the actual proportion, and determine a candidate proportion with a smallest difference as a target proportion; and
  adjust a proportion of the window from the actual proportion to the target proportion;
  wherein the processor is further configured to:
  in response to the window being not a type of game window or a type of video full screen window, obtain attribute information of the window;
    in response to the attribute information of the window meeting a first set condition, determine that the window corresponds to a landscape screen mode and the candidate proportion of the window is a first proportion;
    in response to the attribute information of the window meeting a second set condition, determine that the window corresponds to a portrait screen mode and the candidate proportions of the window are a second proportion and a third proportion;
    in response to the attribute information of the window not meeting the first set condition or the second set condition, determine that the candidate proportions of the window are the first proportion, the second proportion and the third proportion;
    wherein the first proportion, the second proportion and the third proportion are preset in a native scheme in an Android system of the electronic device to enable an application in the window to adapt to the Android system.

7. The apparatus of claim 6, wherein the processor is further configured to:
  obtain attribute information of the window, wherein the attribute information comprises flag information;
  determine that the window is a type of game window in response to the flag information being a preset flag; and
  determine that the candidate proportion of the window is same as a screen proportion of the electronic device.

8. The apparatus of claim 7, wherein the processor is further configured to:
  determine whether an application in the window is within a preset game list in response to the flag information being not included in the attribute information;
  determine that the window is the type of game window in response to determining that the application in the window is within the preset game list; and
  determine that the candidate proportion of the window is same as the screen proportion of the electronic device.

9. The apparatus of claim 6, wherein the processor is further configured to:
  determine that the candidate proportion of the window is same as the screen proportion of the electronic device in response to determining that the window is a type of video full screen window.

10. The apparatus of claim 9, wherein the processor is further configured to:
  obtain attribute information of the window;
  determine a screen mode corresponding to the window in response to determining that a package name in the attribute information is within a preset video list;
  obtain system visible parameters of the window in response to the window corresponding to a landscape screen mode; and
  determine that the window is the type of video full screen window in response to the system visible parameters including a full screen parameter and a hidden navigation bar.

11. A non-transitory computer-readable storage medium, wherein when executable computer programs in the non-transitory computer-readable storage medium are executed by a processor of an electronic device, a method for adjusting a window is carried out, the method comprising:
  in response to detecting a first operation for triggering a specified position of the window, obtaining at least one candidate proportion of the window based on a type of the window, and obtaining an actual proportion of the window, wherein the actual proportion of the window varies with the first operation;
  in response to detecting a second operation for stopping triggering the window, obtaining a difference between the at least one candidate proportion and the actual proportion, and determining a candidate proportion with a smallest difference as a target proportion; and adjusting a proportion of the window from the actual proportion to the target proportion;

wherein obtaining at least one candidate proportion of the window comprises:

in response to the window being not a type of game window or a type of video full screen window, obtaining attribute information of the window;

in response to the attribute information of the window meeting a first set condition, determining that the window corresponds to a landscape screen mode and the candidate proportion of the window is a first proportion;

in response to the attribute information of the window meeting a second set condition, determining that the window corresponds to a portrait screen mode and the candidate proportions of the window are a second proportion and a third proportion;

in response to the attribute information of the window not meeting the first set condition or the second set condition, determining that the candidate proportions of the window are the first proportion, the second proportion and the third proportion;

wherein the first proportion, the second proportion and the third proportion are preset in a native scheme in an Android system of the electronic device to enable an application in the window to adapt to the Android system.

12. The non-transitory computer-readable storage medium of claim 11, wherein obtaining at least one candidate proportion of the window comprises:

obtaining attribute information of the window, wherein the attribute information comprises flag information;

in response to the flag information being a preset flag, determining that the window is a type of game window; and determining that the candidate proportion of the window is same as a screen proportion of the electronic device.

13. The non-transitory computer-readable storage medium of claim 12, wherein the method further comprises:

in response to the flag information being not included in the attribute information, determining whether an application in the window is within a preset game list;

in response to determining that the application in the window is within the preset game list, determining that the window is the type of game window; and determining that the candidate proportion of the window is same as the screen proportion of the electronic device.

14. The non-transitory computer-readable storage medium of claim 11, wherein obtaining at least one candidate proportion of the window comprises:

in response to determining that the window is a type of video full screen window, determining that the candidate proportion of the window is same as the screen proportion of the electronic device.

15. The non-transitory computer-readable storage medium of claim 14, wherein determining the window is the type of video full screen window comprises:

obtaining attribute information of the window;

in response to determining that a package name in the attribute information is within a preset video list, determining a screen mode corresponding to the window;

in response to the window corresponding to a landscape screen mode, obtaining system visible parameters of the window; and in response to the system visible parameters including a full screen parameter and a hidden navigation bar, determining that the window is the type of video full screen window.

* * * * *